United States Patent
Koo et al.

(10) Patent No.: US 8,237,567 B2
(45) Date of Patent: Aug. 7, 2012

(54) SYSTEM AND METHOD FOR MANAGING INFORMATION OF LOADING GOODS

(75) Inventors: Hoon Young Koo, Seoul (KR); Ki Hak Kim, Daejeon (KR); Hong Suk Hu, Daejeon (KR); Jong Heung Park, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 371 days.

(21) Appl. No.: 12/567,147

(22) Filed: Sep. 25, 2009

(65) Prior Publication Data

US 2010/0117832 A1 May 13, 2010

(30) Foreign Application Priority Data

Nov. 7, 2008 (KR) .......................... 10-2008-0110572

(51) Int. Cl.
*G08B 13/14* (2006.01)
(52) U.S. Cl. ................. 340/572.4; 340/572.1; 340/572.7
(58) Field of Classification Search ................ 340/572.1, 340/572.4, 572.7, 572.8, 539.1, 539.11, 10.1, 340/10.3; 235/375–378; 701/200–226; 705/26.61, 705/26.7, 26.8, 29; 700/226; 342/118
See application file for complete search history.

(56) References Cited

U.S. PATENT DOCUMENTS

| | | | |
|---|---|---|---|
| 5,959,568 A * | 9/1999 | Woolley | 342/42 |
| 6,523,752 B2 | 2/2003 | Nishitani et al. | |
| 6,665,585 B2 * | 12/2003 | Kawase | 700/226 |
| 7,030,760 B1 * | 4/2006 | Brown | 340/568.1 |
| 7,085,777 B2 * | 8/2006 | Beck et al. | 1/1 |
| 7,714,773 B2 * | 5/2010 | Ozaki et al. | 342/118 |
| 7,737,857 B2 * | 6/2010 | Ebert et al. | 340/572.4 |
| 8,022,812 B2 * | 9/2011 | Beniyama et al. | 340/10.1 |
| 2009/0315679 A1 * | 12/2009 | Bauchot et al. | 340/10.1 |

FOREIGN PATENT DOCUMENTS

| | | |
|---|---|---|
| JP | 2001-233410 | 8/2001 |
| JP | 2007-219730 | 8/2007 |
| KR | 10-0657817 | 12/2006 |
| KR | 10-2007-0042372 | 4/2007 |
| KR | 10-0784492 | 12/2007 |

* cited by examiner

*Primary Examiner* — Van T. Trieu
(74) *Attorney, Agent, or Firm* — Staas & Halsey LLP

(57) ABSTRACT

The information managing system includes a first antenna for identifying a first tag included by transportation means, a second antenna for identifying a second tag included by goods, a reader for generating tag information which is identification results generated by respectively identifying the corresponding tags through the first antenna and the second antenna, and a control device for mapping information of the first tag and information of the second tag based on the tag information.

8 Claims, 4 Drawing Sheets

SYSTEM AND METHOD FOR MANAGING INFORMATION OF LOADING GOODS

CROSS-REFERENCE TO RELATED APPLICATION

This application claims priority to and the benefit of Korean Patent Application No. 10-2008-0110572 filed in the Korean Intellectual Property Office on Nov. 7, 2008, the entire contents of which are incorporated herein by reference.

BACKGROUND OF THE INVENTION (a) Field of the Invention

The present invention relates to an information managing system and method according to goods loading. Particularly, the present invention relates to a radio frequency (RF) identification applied information managing system and method according to goods loading.

(b) Description of the Related Art

In the radio frequency identification (RFID) application filed, an RFID tag of the passive ultrahigh frequency (UHF) band is widely used in the logistics industry because of its long identification distance and relatively low cost. This kind of RFID technology should fulfill the application objectives of distribution management such as simultaneous identifying of multiple goods, tracking movements of goods, and accurate checking of inventory level.

In the case several tens or hundreds of box-type goods are loaded on transportation means, the tag identification rate becomes different depending on the contents or tag-attached surfaces. Particularly, when the contents are metal or liquid, communication between the tag and the reader is not allowed.

Accordingly, the method for identifying the goods as a whole is frequently inappropriate when storing/delivering the goods in/from a distribution center. In order to solve the problems, it is required to map goods information on a system for managing goods through a barcode scanning process when loading the goods on the transportation means.

On the other hand, problems regarding a work load caused by mapping and mapping information reliability caused by barcode scanning have been generated. Further, the conventional far-field type of UHF band radio frequency identification technology has a great possibility of erroneously identifying adjacent goods, so its application is limited. Therefore, a skill for providing an automatic mapping process through accurate goods identification when the goods are loaded on the transportation means is needed.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide an information managing system and method according to goods loading for providing a mapping method by identifying an RFID tag attached to goods and an RFID tag attached to transportation means when loading the goods on the transportation means.

An exemplary embodiment of the present invention provides a method for managing information when loading goods on transportation means including: identifying a first tag included in the transportation means through a first antenna and generating first tag information; identifying a second tag included in the goods through a second antenna and generating second tag information; and mapping the second tag information on the first tag information and storing the same.

Another embodiment of the present invention provides an information managing system and method according to goods loading including: a first antenna for identifying a first tag included in transportation means; a second antenna for identifying a second tag included in goods; a reader for generating tag information which is identification results generated by respectively identifying the first tag and the second tag through the first antenna and the second antenna; and a control device for mapping information of the first tag and information of the second tag based on the tag information.

DETAILED DESCRIPTION OF THE EMBODIMENTS

Figure 1:
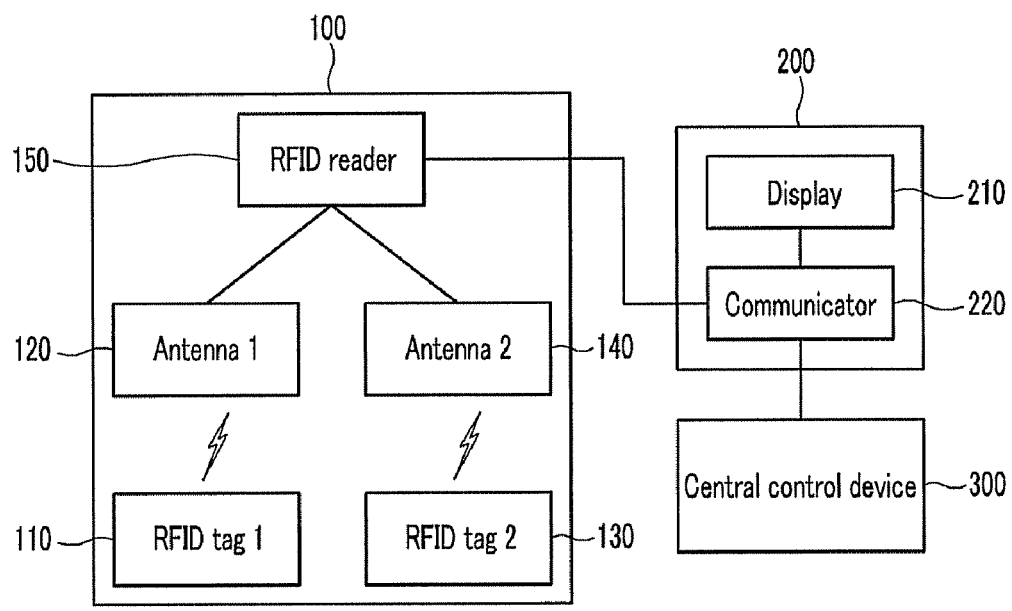
FIG. 1 shows a block diagram of an information managing system for goods loading according to an exemplary embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout the specification, unless explicitly described to the contrary, the word "comprise" and variations such as "comprises" or "comprising" will be understood to imply the inclusion of stated elements but not the exclusion of any other elements.

Hereinafter, an information managing system and method for loading goods according to an exemplary embodiment of the present invention will be described with reference to accompanying drawings.

First, a distribution center loads goods on transportation means such as a pallet, picks and packs the goods for delivery, and classifies the same as parcel distribution or postal distribution.

When the goods are distinguished or moved to be loaded on the transportation means such as a pallet, a goods loading system identifies the pallet and the goods, and generates mapping information corresponding to the identification result.

The mapping process according to an exemplary embodiment of the present invention connects tag information on the goods that are loaded on the transportation means and tag information on the transportation means, and identifies the loaded goods when identifying the corresponding transportation means on which the goods loaded.

Figure 2:
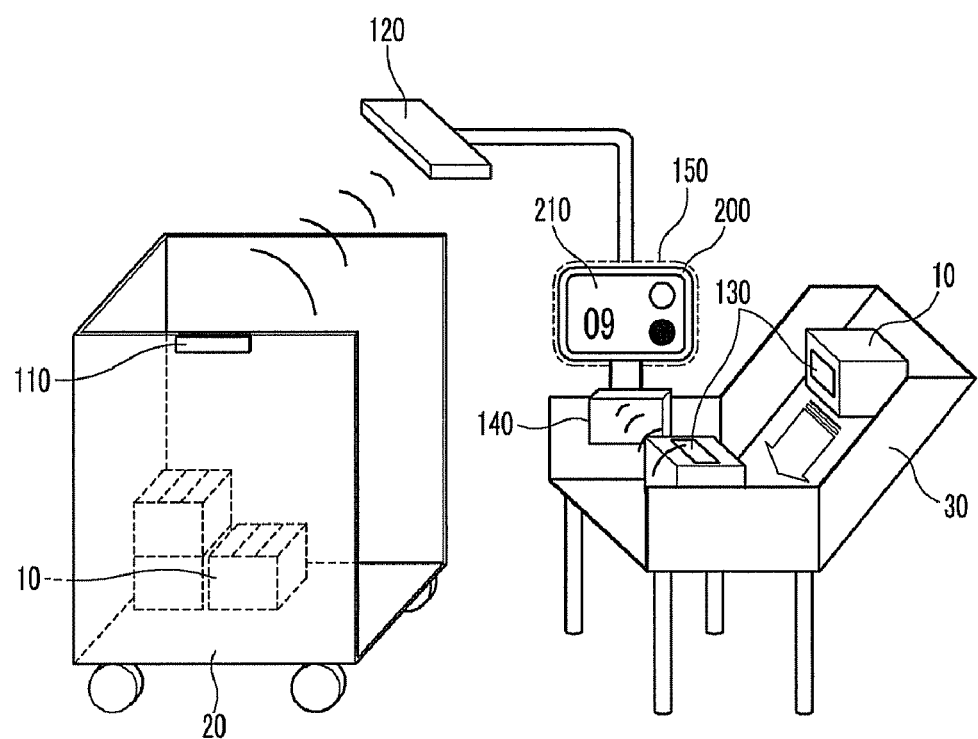
FIG. 2 shows a state in which goods to which an information managing system for goods loading according to an exemplary embodiment of the present invention is applied are loaded on transportation means.

FIG. 1 shows a block diagram of an information managing system for goods loading according to an exemplary embodiment of the present invention, and FIG. 2 shows a state in which goods to which an information managing system for goods loading according to an exemplary embodiment of the present invention is applied is loaded on transportation means.

The information managing system for goods loading according to an exemplary embodiment of the present invention includes an RFID device 100, a display device 200, and a central control device 300, as shown in FIG. 1 and FIG. 2. As shown in FIG. 2, the information managing system is applied to transmitted goods 10 and transportation means 20, and collects mapping information when the goods 10 are moved to a chute 30 and are then loaded on the transportation means 20.

Regarding the configuration of the information managing system for goods loading with reference to FIG. 1, the RFID device 100 includes a first RFID tag 110, a first antenna 120, a second RFID tag 130, a second antenna 140, and an RFID reader 150. As shown in FIG. 2, the antennas 120 and 140 for identifying an RFID reader 150, goods 10, and the transportation means 20 are installed in the workplace where mapping information is collected.

The first RFID tag 110 is attached to the transportation means 20, and the second RFID tag 130 is attached to the goods 10.

The first antenna 120 identifies the first RFID tag 110 attached to the transportation means 20, and it can be a far-field type of antenna which utilizes electro-magnetic field. In detail, when the goods 10 are moved to the chute 30 so as to be loaded on the transportation means 20 and the transportation means 20 reaches the corresponding chute 30, the first antenna 120 identifies the first RFID tag 110 attached to the transportation means 20. The first antenna 120 identifies the first RFID tag 110 attached to the transportation means 20 which moves freely, and so it is inappropriate to use a near-field type antenna with a narrow identification range.

The second antenna 140 identifies the second RFID tag 130 attached to the goods 10, and it can be a near-field type of antenna which utilizes magnetic field so that the identification area has clear shape but less coverage.

In detail, when the goods 10 are moved to the chute 30 so as to be loaded on the transportation means 20, the second antenna 140 identifies the second RFID tag 130.

In the case of a far-field type antenna as opposed to a near-field type antenna, the second antenna 140 may erroneously identify the adjacent RFID tag as a mapping target instead of the RFID tag that is the actual mapping target. That is, for example, the second antenna 140 according to an exemplary embodiment of the present invention can stably identify near goods by using a near-field type antenna within a distance of less than 50 cm.

The first antenna 120 and the second antenna 140 respectively have an identification area for identifying the tag. In this instance, the first antenna 120 starts to identify the tag when the transportation means 20 is in the corresponding identification area, and it stops identifying the tag when the transportation means 20 is out of the identification area. Also, the second antenna 140 starts to identify the tag when the goods 10 stay in the corresponding identification area, and it stops identifying the tag when the goods 10 come out of the identification area.

The conventional goods loading system has a sufficient identification distance by using a UHF bandwidth far-field type antenna, but has a problem of erroneously identifying neighboring tags. On the contrary, the goods loading system according to an exemplary embodiment of the present invention solves the problem of acquiring the identification distance and erroneously identifying the object by using the first antenna 120 and the second antenna 140, and combining the far-field method and the near-field method.

The RFID reader 150 generates an identification result caused by identifying the corresponding RFID tag through the first antenna 120 and the second antenna 140, that is, tag information, and transmits the same to the display device 200. In this instance, tag information includes information corresponding to the transportation means 20 to which the first RFID tag 110 is attached and information corresponding to the goods 10 to which the second RFID tag 130 is attached.

In the exemplary embodiment of the present invention, the equipment cost is reduced by receiving the results of identifying the corresponding tags from the first antenna 120 and the second antenna 140 and processing the same by using the RFID reader 150.

The display device 200 includes a communicator 220 and a display 210, it is operable in cooperation with the RFID reader 150, and it is connected to the central control device 300.

The communicator 220 transmits the received tag information to the display 210 and the central control device 300, and receives mapping information from the central control device 300. Here, the mapping information includes information of the goods 10 to which the second RFID tag 130 is attached and information of the transportation means 20 to which the corresponding goods are loaded and the first RFID tag 110 is attached.

The communicator 220 according to an exemplary embodiment of the present invention can be a middleware type.

The display 210 notifies an operator of the tag information provided by the communicator 220 in sound or video, and simultaneously displays information on the number of mapped goods.

The display device 200 according to an exemplary embodiment of the present invention is illustrated to be separated from the goods loading system as shown in FIG. 2, but it is not restricted thereto.

The central control device 300 maps information corresponding to the second RFID tag 130 on tag information corresponding to the first RFID tag 110 based on the tag information provided by the communicator 220 to generate mapping information, and stores the generated mapping information. Also, it updates the mapping information each time the mapping is performed.

In detail, when the RFID reader 150 has identified the first RFID tag 110 in the case of loading the goods 10 on the transportation means 20, the central control device 300 determines that information of the first RFID tag 110 and information on the second RFID tag 130 to which goods are attached can be mapped, and when identification of the first RFID tag 110 is completed, information of the first RFID tag 110 and information of the second RFID tag 130 are mapped, and the transportation means 20 is determined to have moved to another location, and corresponding mapping information is generated. In this instance, the central control device 300 determines that the transportation means 20 to which the first RFID tag 110 is attached has arrived at the mapping location when the tag identification number identified per time from the time when the first antenna 120 has initially identified the first RFID tag 110 is greater than a predetermined number of times. Here, the mapping location includes a location where the first antenna 120 can identify the first RFID tag attached to the corresponding transportation means 20 on which the goods 10 are loaded, that is, the location including a range for identifying the transportation means 20.

Also, when the RFID reader 150 has identified the second RFID tag 130, the central control device 300 determines that the goods 10 stand by for being mapped on the transportation means 20, and when identification of the second RFID tag 130 is terminated, the central control device 300 determines that the goods 10 are loaded on the transportation means 20 to generate corresponding mapping information. In this instance, when the second antenna 140 initially identifies the second RFID tag 130 attached to the goods 10 and receives corresponding tag information, the central control device 300 determines that the mapping process has started.

The central control device 300 according to an exemplary embodiment of the present invention compares identification degrees of the RFID tags attached to the transportation means. Here, when the tag identification number identified per time from the time when the RFID tag attached to the transportation means is initially identified is greater than a predetermined number of times, the RFID tag attached to the transportation means is determined to have been identified. Accordingly, the case of erroneously identifying another RFID tag attached to the transportation means can be prevented.

Further, information of the second RFID tag 130 identified through the first antenna 120 is eliminated by recording the first RFID tag 110 and the second RFID tag 130 as class types.

When the first antenna 120 has identified the first RFID tag 110 attached to the transportation means 20 to which the goods are loaded, the central control device 300 predicts information of the goods 10 mapped with the transportation means 20 on which the first RFID tag 110 is attached based on mapping information corresponding to the first RFID tag 110. That is, the goods loading system according to an exemplary embodiment of the present invention can identify the loaded goods while only identifying the transportation means on which the goods are loaded through mapping the goods and the transportation means.

The mapping process between the goods 10 and the transportation means 20 when loading the goods 10 on the transportation means 20 will now be described in detail with reference to FIG. 3.

Figure 3:
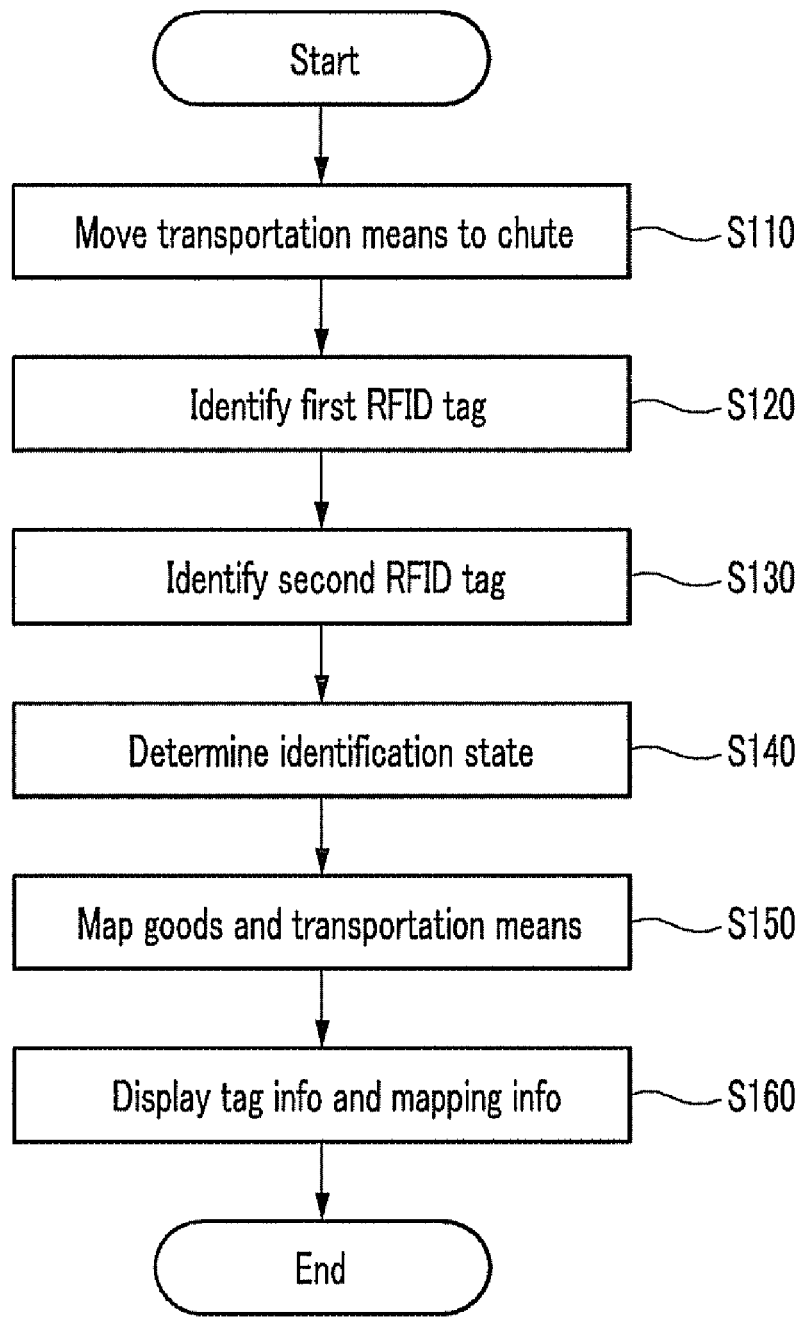
FIG. 3 shows a flowchart of mapping goods on transportation means according to an exemplary embodiment of the present invention.

FIG. 3 shows a flowchart for mapping goods on transportation means according to an exemplary embodiment of the present invention.

The goods loading system according to an exemplary embodiment of the present invention is applied to the case in which the goods 10 are moved to the chute 30 and are then loaded on the corresponding transportation means 20.

As shown in FIG. 3, the transportation means 20 is moved to the chute 30 for transmitting the goods 10 so as to load the goods 10 (S110). Here, the first RFID tag 110 is attached to the transportation means 20, and the second RFID tag 130 is attached to the goods 10.

The far-field type first antenna 120 identifies the first RFID tag 110 corresponding to the transportation means 20 (S120). Also, the near-field second antenna 140 identifies the second RFID tag 130 corresponding to the goods 10 (S130).

The RFID reader 150 transmits identification results, that is, tag information, to the communicator 220 and the central control device 300 through the first antenna 120 and the second antenna 140.

The central control device 300 determines whether a mapping process between the transportation means 20 and the goods 10 is executable based on the tag information (S140). In detail, the central control device 300 determines that the first RFID tag 110 attached to the transportation means 20 and the second RFID tag 130 attached to the goods can be mapped through the tag information acquired by the RFID reader 150 by identifying the first RFID tag 110. In this instance, the central control device 300 determines that the transportation means 20 can be mapped when the tag identification number identified per time from the time when the first antenna 120 has initially identified the first RFID tag 110 is greater than a predetermined number of times.

Also, the central control device 300 determines that the goods 10 can be mapped (i.e., stands by for mapping) through the tag information acquired by the RFID reader 150 by identifying the second RFID tag 130.

The central control device 300 maps the transportation means 20 and the goods 10 (S150). Here, the mapping process identifies the loaded goods 10 when the transportation means 20 on which the goods 10 are loaded in connection with information of the goods 10 loaded on the transportation means 20. After performing the mapping process, the central control device 300 generates mapping information and transmits the same to the display 210.

The display 210 displays the tag information and the mapping information so that the operator may view them (S160).

A method for identifying the transportation means 20 and thereby identifying the loaded goods 10 when the goods 10 are loaded on the transportation means 20 according to an exemplary embodiment of the present invention will now be described in detail with reference to FIG. 4.

Figure 4:
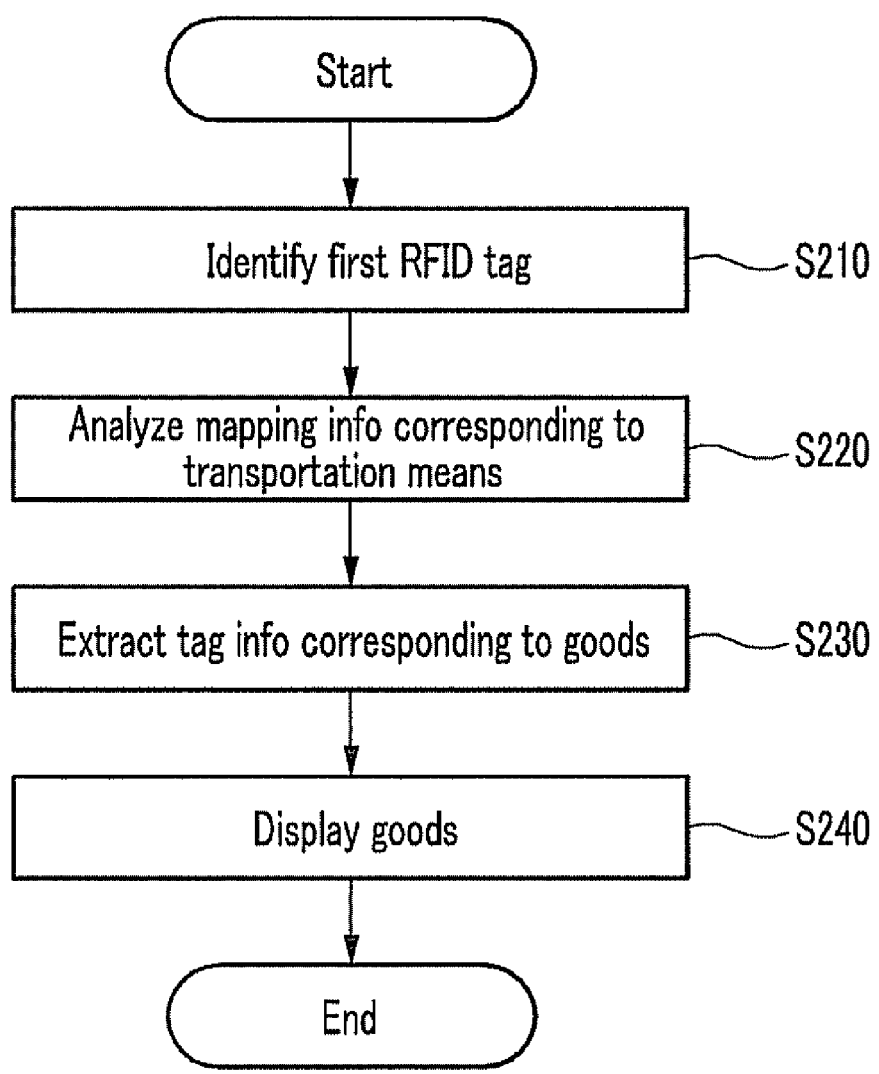
FIG. 4 shows a flowchart of a goods identification method according to an exemplary embodiment of the present invention.

FIG. 4 shows a flowchart of a goods identification method according to an exemplary embodiment of the present invention.

When the goods 10 are loaded on the transportation means 20 in the goods loading system, the tags respectively corresponding to the goods 10 and the transportation means 20 are mapped.

As shown in FIG. 4, the goods loading system identifies the first RFID tag 110 attached to the transportation means 20 through the first antenna 120 (S210). In this instance, the goods loading system determines that the corresponding transportation means 20 on which the first RFID tag 110 is attached is located in the job space in which the process for collecting mapping information is performed when the tag identification number identified per time from the time when the first RFID tag 110 is initially identified is greater than a predetermined number of times.

The goods loading system analyzes the mapping information acquired and stored corresponding to the transportation means 20 based on the identification result of the first RFID tag 110, that is, tag information (S220). Here, the mapping information is generated when the mapping process is performed, and it represents information on the transportation means 20 on which the goods 10 on which the second RFID tag 130 is attached are loaded and the first RFID tag 110 is attached.

According to the result acquired by analyzing the mapping information, the goods loading system extracts tag information corresponding to the goods 10 mapped with the transportation means 20 (S230).

The goods loading system displays the goods 10 on which the second RFID tag 130 corresponding to the extracted tag information so that the operator may view it (S240).

Therefore, the process of storing and delivering the goods 10 loaded on the transportation means 20 can be performed by acquiring tag information corresponding to the transportation means 20 when the goods are stored/delivered in/from the distribution center.

According to an embodiment of the present invention, goods are automatically and accurately identified when the goods are loaded on transportation means, thereby increasing job productivity. Also, the goods loaded on the transportation means can be stored and delivered through transportation means information when the goods are stored/delivered in/from the distribution center through the information managing system and method according to goods loading.

The above-described embodiments can be realized through a program for realizing functions corresponding to the configuration of the embodiments or a recording medium for recording the program in addition to through the above-described device and/or method, which is easily realized by a person skilled in the art.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A method for managing information when loading goods on transportation, comprising:
    identifying a first tag included in the transportation through a first antenna and generating first tag information;
    identifying a second tag included in the goods through a second antenna and generating second tag information;
    mapping the second tag information on the first tag information and storing the mapping information; and
    determining whether mapping between the transportation and the goods is executable based on the first and second tag information and where the determining includes
    determining that mapping between the transportation and the goods is executable when the tag identification number identified per time from the time when the first tag is initially identified is greater than a number of times established for determining the mapping allowable state.

2. The method of claim 1, wherein
    determining that the goods stand by for mapping when the second tag is identified; and
    determining that the goods are loaded on the transportation when the identifying the second tag through the second antenna is finished.

3. The method of claim 1, wherein
    the first antenna operates within a first area for identifying transportation, and the second antenna operates within a second area for identifying goods, and
    the first area is greater than the second area.

4. The method of claim 1, further including,
    after mapping the second tag information on the first tag information and storing the mapping second tag information as mapping information,
    identifying a first tag corresponding to a transportation;
    searching mapping information corresponding to the transportation based on the identification result of the first tag and analyzing the mapping information;
    extracting information of the second tag based on the mapping information analysis result; and
    predicting goods corresponding to information of the extracted second tag.

5. The method of claim 4, wherein
    the mapping information is generated by mapping the second tag information on the first tag information.

6. A system for managing information according to goods loading comprising:
    a first antenna for identifying a first tag included in transportation;
    a second antenna for identifying a second tag included in goods;
    a reader for generating tag information which is identification results generated by respectively identifying the first tag and the second tag through the first antenna and the second antenna; and
    a control device for mapping information of the first tag and information of the second tag based on the tag information,
    wherein the control device determines that mapping between the transportation and the goods is executable when the tag identification number identified per time from the time when the first tag is identified is greater than a number of times established for determining the mapping allowable state.

7. The system of claim 6, further including
    a display for outputting the tag information and the mapping information.

8. The system of claim 6, wherein
    the first antenna operates within a first area for identifying transportation, and the second antenna operates within a second for identifying goods, and
    the first area is greater than the second area.

* * * * *